United States Patent
Kato

(10) Patent No.: US 7,972,012 B2
(45) Date of Patent: Jul. 5, 2011

(54) PROJECTOR HAVING COOLING DEVICE FOR COOLING TARGET OBJECT AND CONTROL DEVICE FOR CONTROLLING COOLING DEVICE

(75) Inventor: Hisamaro Kato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 12/185,168

(22) Filed: Aug. 4, 2008

(65) Prior Publication Data

US 2009/0046255 A1 Feb. 19, 2009

(30) Foreign Application Priority Data

Aug. 17, 2007 (JP) ................................ 2007-212643

(51) Int. Cl.
*G03B 21/16* (2006.01)
(52) U.S. Cl. .......................................... 353/52; 353/57
(58) Field of Classification Search .............. 353/57–60, 353/52
See application file for complete search history.

(56) References Cited

U.S. PATENT DOCUMENTS

| 5,121,291 A * | 6/1992 | Cope et al. .................... 361/695 |
| 6,322,218 B1 | 11/2001 | Sugawara et al. | |
| 2003/0216882 A1 * | 11/2003 | Lai et al. ....................... 702/132 |
| 2005/0094705 A1 * | 5/2005 | Chi ................................. 374/121 |
| 2006/0290895 A1 * | 12/2006 | Park et al. ....................... 353/61 |
| 2006/0291994 A1 * | 12/2006 | Bok et al. ........................ 415/47 |

FOREIGN PATENT DOCUMENTS

| GB | 2272301 A | * | 5/1994 |
| JP | 2000-194072 A | | 7/2000 |
| JP | 4017775 | | 7/2000 |
| JP | 2001-022451 | | 1/2001 |
| JP | 2002-174856 A | | 6/2002 |
| JP | 2002-357317 | | 12/2002 |
| JP | 2004-279924 | | 10/2004 |

* cited by examiner

*Primary Examiner* — Thanh X Luu
(74) *Attorney, Agent, or Firm* — AdvantEdge Law Group, LLC

(57) ABSTRACT

A projector includes a cooling device for performing cooling of a target object housed inside a housing, a first temperature sensor disposed in an anterior stage of the target object on a cooling path formed by the cooling device inside the housing, and for measuring a first detection temperature in an anterior area of the cooling among peripheral areas of the target object, a second temperature sensor disposed in a posterior stage of the target object on the cooling path, and for measuring a second detection temperature in a posterior area of the cooling among the peripheral areas, and a control device for performing calculation regarding the temperature of the target object from the first detection temperature and the second detection temperature, and controlling the cooling device based on the result of the calculation.

7 Claims, 4 Drawing Sheets

PROJECTOR HAVING COOLING DEVICE FOR COOLING TARGET OBJECT AND CONTROL DEVICE FOR CONTROLLING COOLING DEVICE

BACKGROUND

1. Technical Field

The present invention relates to a projector having a cooling device incorporated therein and capable of cooling a target object such as an optical component on demand.

2. Related Art

There is known a device in, for example, a light path deflection device or a projector having an optical component such as a light path deflection element using a liquid crystal material, having internal temperature sensors for measuring the temperature of the sections the temperature of which the tendency of the temperature of the component can be figured from, and performing control of an air blower for sending air to the optical component in accordance with the temperature measured by each of the temperature sensors in order for maintaining the temperature of the optical component fixedly.

Further, there is known a device having an external temperature sensor for detecting the temperature of the air distributed to the optical component and an internal temperature sensor for detecting the temperature of the place from the temperature of which the tendency of the temperature of the optical component can be estimated, thereby performing control of the air blower for distributing the air to the optical component in accordance with the temperature detected by each of the temperature sensors (JP-A-2004-279924). Further, there is also known a device which detects the temperature condition on the periphery and the inside of the device housing using a plurality of temperature sensors, and performs temperature control, display control, and power supply control in accordance therewith (JP-A-2001-22451). Further, there is known a device which is provided with a section for examining an amount of a load applied to the device in addition to a section for detecting the temperature difference between the internal temperature and the external temperature of the device, thereby making a judgment on blockage of an air charge/discharge port (JP-A-2002-357317).

However, in using the projector, for example, regarding an extent of overheating of the optical component inside the projector, the extent of overheating of the target object such as an optical component inside the projector such as a rate of increase in the temperature thereof cannot necessarily be estimated correctly only by the internal temperature of the projector device because of an influence of, for example, clogging of an air filter for taking the external air in the projector.

FIGS. 4A through 4C are diagrams for explaining the internal temperature condition of the projector which may occur in the projector in the related art by way of exemplification. The projector in the related art is provided with, for example, a thermistor disposed at a predetermined place inside the housing, and performs the temperature control using the temperature (hereinafter referred to as "internal temperature") measured at that place as a criterion. In this case, as shown in FIG. 4A, in the internal temperature measured at the place where the thermistor is installed and the temperature (hereinafter referred to as "target object temperature") of what should be the target object of the temperature measurement such as a polarization conversion device, there is the case in which when the room temperature, namely the ambient air temperature is, for example, 25° C., the internal temperature is 45° C., which is 20° C. higher than the room temperature, while the target object temperature is 65° C., which is 40° C. higher than the room temperature. It is conceivable that even in such a case, if the cooling device or the like of the projector operates normally, when, for example, the external environment changes to raise the room temperature to 40° C. as shown in FIG. 4B, the condition in which the internal temperature is 20° C. higher than the room temperature and the target object temperature is 40° C. higher than the room temperature is maintained, and the internal temperature becomes 60° C. while the target object temperature becomes 80° C. However, there is also the case in which the cooling effect is reduced because of, for example, the clogging caused in the air filter attached to the cooling device. In such a case, in comparison between the internal temperature and the target object temperature, the target object temperature, which originally has larger temperature rise, is apt to rise more easily, and consequently, when the cooling effect has reduced, there can be caused the case in which, for example, the internal temperature rises 30° C. to be 55° C. while the room temperature is kept in 25° C., and the target object temperature, which can more easily be raised, becomes 92.5° C. as shown in FIG. 4C. In such a case, as is understood from the comparison between FIGS. 4B and 4C, there is caused the condition in which although the target object temperature to be an important criterion for performing the cooling operation is higher in the condition shown in FIG. 4C, the external temperature and the internal temperature actually measured are both lower in the condition shown in FIG. 4C than in the condition shown in FIG. 4B. In other words, the temperature control performed based on the external room temperature and the internal temperature is not necessarily appropriate.

Therefore, it is desirable to perform measurement with the temperature sensor directly attached to the optical component in the projector. However, the optical component such as a polarization conversion element is usually disposed on the light path in the projector. Therefore, it is not necessarily easy to directly attach the temperature sensor to the optical component for performing measurement because it is required to dispose the temperature sensor at a place where the temperature sensor does not make a shadow on the optical path. Further, there is a possibility of damaging the temperature sensor because of the influence of the heat from the optical component depending on the place where the temperature sensor is attached.

Further, in the case in which the amount of load (e.g., an amount of the power supply current supplied to the entire device) applied to the device in addition to the temperature, it is required to provide the device for measuring the amount of the load separately from the device for measuring the temperature in order for measuring the amount of the load.

SUMMARY

Therefore, an advantage of the invention is to provide a projector capable of appropriately performing the cooling control based even on the detected temperature measured indirectly without directly measuring the temperature of the target object, thereby preventing the target object from overheating.

A projector according to an aspect of the invention includes (a) a cooling device for performing cooling of a target object housed inside a housing, (b) a first temperature sensor disposed in an anterior stage of the target object on a cooling path formed by the cooling device inside the housing, and for measuring a first detection temperature in an anterior area of the cooling among peripheral areas of the target object, (c) a second temperature sensor disposed in a posterior stage of the target object on the cooling path, and for measuring a second detection temperature in a posterior area of the cooling among the peripheral areas of the target object, and (d) a control device for performing calculation regarding the temperature of the target object from the first detection temperature and the second detection temperature, and controlling the cooling device based on the result of the calculation.

According to the projector described above, by measuring the temperatures in the anterior side of the cooling and the posterior side of the cooling in the periphery of the target object by the first temperature sensor and the second temperature sensor, and performing the calculation regarding the temperature of the target object from the detection temperatures thus measured, the information regarding the temperature of the target object can be calculated with relative accuracy even with the estimated temperatures measured indirectly. Further, since the cooling device can appropriately be controlled in accordance with the calculated result, as a result, it becomes possible not only to perform the temperature management of the target object, but also to prevent the target object from overheating.

Further, according to a specific aspect of the invention, the control device performs setting of intensity of the cooling performed by the cooling device based on the result of the calculation. In this case, the setting of intensity of the cooling corresponding to the estimated temperature of the target object becomes possible.

Further, according to another specific aspect of the invention, the control device changes setting of the cooling performed by the cooling device in accordance with an update of the result of the calculation, thereby controlling a temperature variation of the target object within a certain range. In this case, since the setting of the cooling of the cooling device can be changed in accordance with the variation of the temperature of the target object by feeding-back the condition of the temperature of the target object, it becomes possible to control the temperature variation of the target object within a certain range, thus maintaining the stable operation of the projector.

Further, according to another specific aspect of the invention, the control device performs the calculation regarding the temperature of the target object using a predetermined conversion formula including a term having the first detection temperature and a term having a square root of a temperature difference obtained by subtracting the first detection temperature from the second detection temperature. In this case, as the predetermined conversion formula, the following formula can be cited.

$$T_p = T_r + a\sqrt{T_i - T_r} + b$$

Here, Tp denotes the estimated temperature of the target object, Tr denotes the first detection temperature, Ti denotes the second detection temperature, a and b are constants determined in accordance with a heat release value of the target object, an internal structure of the projector, or an arrangement of the temperature sensors. By estimating the temperature of the target object along such a conversion formula, even if direct measurement of the temperature of the target object is not executable, the estimated temperature of the target object can be calculated with simplicity and relative accuracy.

Further, according to another specific aspect of the invention, the control device includes a storage section for storing temperature data with which the temperature of the target object can be estimated from the first detection temperature and the second detection temperature, and performs calculation regarding the temperature of the target object looking-up the temperature data stored in the storage section. In this case, by looking-up the temperature data stored in the storage section based on the first and second detection temperature thus measured, the temperature of the target object can further simply and easily be estimated.

Further, according to still another specific aspect of the invention, the target object is an optical component. In this case, by assigning the target object to the optical component, which particularly needs to be cooled in using the projector, the appropriate extent of cooling in using the projector can be performed, thus the optical performance of the projector can appropriately be maintained.

Further, according to still another specific aspect of the invention, the optical component includes one of a liquid crystal panel, a polarization plate, and a polarization conversion element. In this case, since the liquid crystal panel, the polarization plate, and the polarization conversion element significantly influenced by overheating among optical components are assigned to the target object, the stable operation of the projector can be maintained.

Further, according to another specific aspect of the invention, the cooling device includes a cooling fan for generating a cooling airflow, the first temperature sensor is disposed upstream of the target object in the cooling airflow, and the second temperature sensor is disposed downstream of the target object in the cooling airflow. In this case, the appropriate cooling of the projector can be performed with relative ease and simplicity, and low cost, and further, the information regarding the temperature of the target object can be calculated with relative accuracy.

Further, according to still another specific aspect of the invention, the projector further includes an illumination light source device for equalizing light source beam from a light source to form illumination light, a light modulation device illuminated by an illumination light from the illumination light source device, and a projection optical system for projecting an image beam obtained via the light modulation device, and the target object is included in at least one of the illumination light source device, the light modulation device, and the projection optical system. In this case, the temperature management for the target object included in either of the illumination light source device, the light modulation device, and the projection optical system becomes possible, thus the entire projection device can be prevented from overheating.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
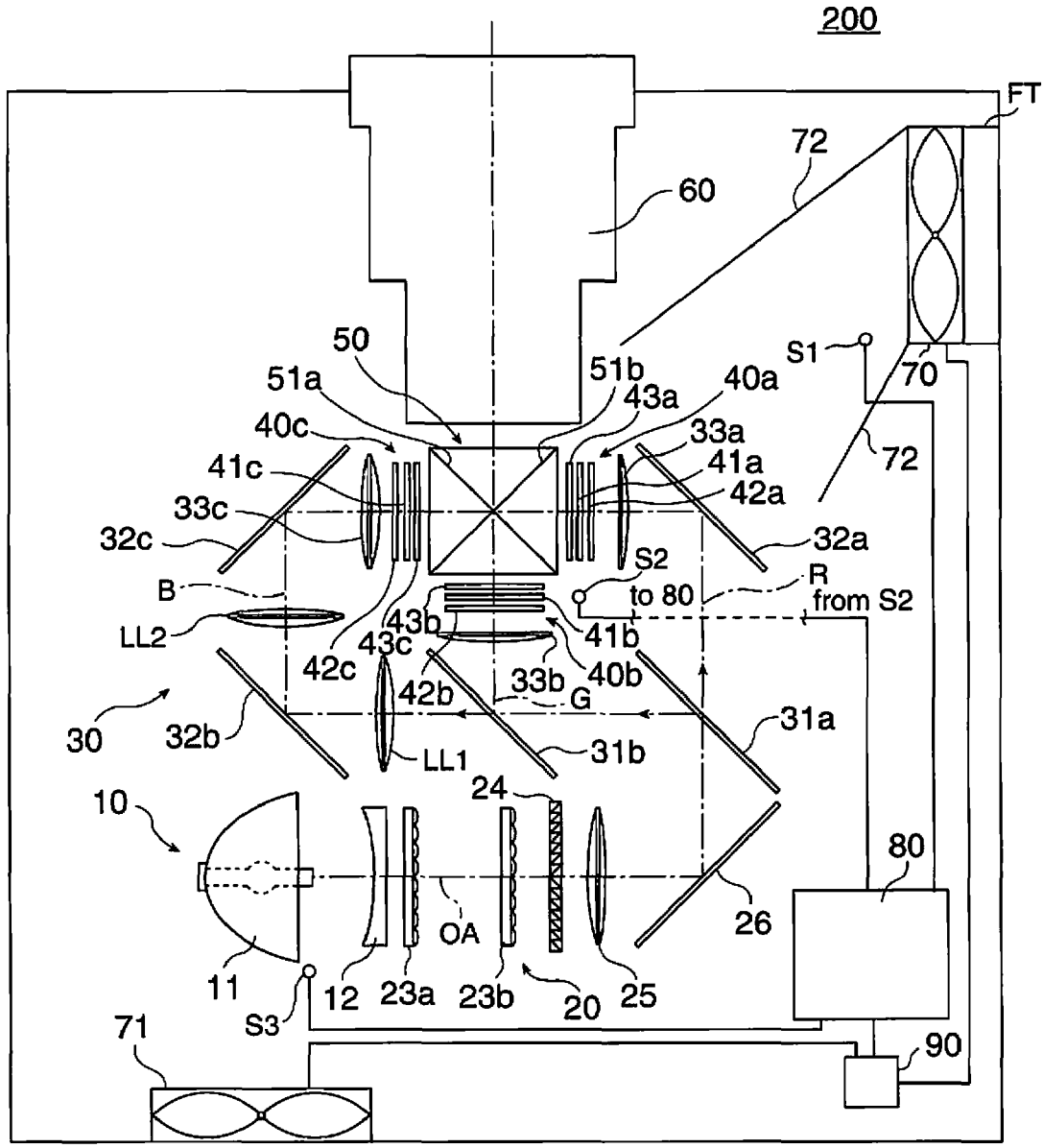
FIG. 1 is a diagram for explaining a projector according to an embodiment of the invention.

FIG. 1 is a conceptual diagram for explaining a structure of a projector according to a first embodiment. The projector 200 of the present embodiment is provided with a light source device 10, an equalizing optical system 20, a color separation optical system 30, liquid crystal light valves 40a, 40b, 40c, a cross dichroic prism 50, a projection lens 60, an air intake fan 70 for introducing external air in the inside of the projector 200 to perform cooling in an air-cooling manner, an exhaust fan 71 for discharging the air used for cooling to the outside, a drive device 90 for driving the fans 70, 71, and a control device 80 for controlling the operations of the drive device 90 and so on. Here, the light source device 10 and the equalizing optical system 20 forms an illumination light source device. It should be noted that these optical components and so on forming the projector 200 are integrally housed by a housing SC.

In the projector 200, the light source device 10 is provided with a light source unit 11 and a collimating lens 12, and emits the light source light for illuminating the liquid crystal valves 40a, 40b, 40c via the equalizing optical system 20 and so on. The light source unit 11 is composed of a high-pressure mercury lamp, a reflector, and so on. The collimating lens 12 substantially collimates the directions of the light beams of the illumination light emitted from the light source device 10.

The equalizing optical system 20 is provided with first and second fly-eye lenses 23a, 23b forming an integrator optical system for dividing and then overlapping the light, a polarization conversion element 24 for aligning the polarization direction of the light, an overlapping lens 25 for overlapping the light transmitted through the both fly-eye lenses 23a, 23b, and a mirror 26 for folding the light path of the light, and thus forming the substantially white illumination light thus equalized by these components. In the equalizing optical system 20, the first and second fly-eye lenses 23a, 23b are each formed of a plurality of element lenses arranged in a matrix, divide and then individually collect the light transmitted through the collimating lens 12 by the element lenses forming the first fly-eye lens 23a, and then provide each of the divided light beams from the first fly-eye lens 23a with an appropriate divergent angle and emit them by the element lenses forming the second fly-eye lens 23b. The polarization conversion element 24 is formed of an array of elements each composed of a PBS, a mirror, a retardation plate, and so on, and has a role of aligning the polarization directions of partial beams divided into by the first fly-eye lens 23a into a linear polarization of a single direction. The overlapping lens 25 appropriately collects the illuminating light as a whole, which is transmitted through the polarization conversion element 24, thus, making the overlapping illumination on the illumination area of the liquid crystal light valves 40a, 40b, and 40c as the posterior light modulation devices of the respective colors possible.

The color separating optical system 30 is provided with first and second dichroic mirrors 31a, 31b, reflecting mirrors 32a, 32b, and 32c, and three field lenses 33a, 33b, and 33c, and separates the illuminating light equalized by the equalizing optical system 20 into three colors, red (R), green (G), and blue (B), and at the same time, guides the respective colored light beams to the posterior liquid crystal light valves 40a, 40b, and 40c. In a further detailed explanation, firstly the first dichroic mirror 31a transmits the R light out of the R light, G light, and B light, and reflects the G light and B light. Further, the second dichroic mirror 31b reflects the G light out of the G light and B light, and transmits the B light. Then, in the color separating optical system 30, the R light transmitted through the first dichroic mirror 31a enters the field lens 33a for adjusting the incident angle via the reflecting mirror 32a. Further, the G light, which is reflected by the first dichroic mirror 31a and further reflected also by the second dichroic mirror 31b, enters the field lens 33b for adjusting the incident angle. Further, the B light passing through the second dichroic mirror 31b enters the field lens 33c for adjusting the incident angle via the relay lenses LL1, LL2, and the reflecting mirrors 32b, 32c.

The liquid crystal light valves 40a, 40b, and 40c are passive type of light modulation devices for modulating the spatial intensity distribution of the incident illuminating light beams, and are provided with three liquid crystal panels 41a, 41b, and 41c to be illuminated corresponding to the respective colored light beams emitted from the color separating optical system 30, three first polarization filters 42a, 42b, and 42c respectively disposed on the entrance side of the liquid crystal panels 41a, 41b, and 41c, and three second polarization filters 43a, 43b, and 43c respectively disposed on the exit side of the liquid crystal panels 41a, 41b, and 41c. The R light transmitted through the first dichroic mirror 31a enters the liquid crystal light valve 40a via the field lens 33a and so on, and illuminates the liquid crystal panel 41a of the liquid crystal light valve 40a. The G light reflected by both the first and second dichroic mirrors 31a, 31b enters the liquid crystal light valve 40b via the field lens 33b and so on, and illuminates the liquid crystal panel 41b of the liquid crystal light valve 40b. The B light reflected by the first dichroic mirror 31a, and transmitted through the second dichroic mirror 31b enters the liquid crystal light valve 40c via the field lens 33c and so on, and illuminates the liquid crystal panel 41c of the liquid crystal light valve 40c. Each of the liquid crystal panels 41a through 41c modulates the spatial intensity distribution of the incident illuminating light along the polarization direction, and the three colors of light beams respectively entering the liquid crystal panels 41a through 41c are respectively controlled in the polarization condition for every pixel in accordance with the drive signals or image signals input to the respective liquid crystal panels 41a through 41c as electric signals. In this case, the polarization directions of the illuminating light beams entering the respective liquid crystal panels 41a through 41c are adjusted by the first polarization filters 42a through 42c, and at the same time, the modulated beams with predetermined polarization directions are taken out from the modulated beams emitted from the respective liquid crystal panels 41a through 41c by the second polarization filters 43a through 43c. According to the above process, the liquid crystal light valves 40a, 40b, and 40c form image beams of the respective colors.

The cross dichroic prism 50 combines the image beams of the respective colors from the liquid crystal light valves 40a, 40b, and 40c. In further details, the cross dichroic prism 50 has a substantially square planar shape formed of four rectangular prisms bonded with each other, and on the interfaces on which the rectangular prisms are bonded with each other, there are formed a pair of dielectric multilayer films 51a, 51b intersecting with each other forming an X-shape. One of the pair of dielectric multilayer films, the first dielectric multilayer film 51a, reflects the R light while the other of the pair of dielectric multilayer films, the second dielectric multilayer film 51b, reflects the B light. The cross dichroic prism 50 reflects the R light from the liquid crystal light valve 40a with the dielectric multilayer film 51a to emit the R light towards the right side in the traveling direction, makes the G light from the liquid crystal light valve 40b travel straight to be emitted via the dielectric multilayer films 51a, 51b, and reflects the B light from the liquid crystal light valve 40c with the dielectric multilayer film 51b to emit the B light towards the left side in the traveling direction. In this way, the R light, the G light, and the B light are combined by the cross dichroic prism 50, and the composite light beam as the image light beam corresponding to the color image can be formed.

The projection lens 60, which is the projection optical system, magnifies the image beam formed of the composite beam composed through the cross dichroic prism 50 at a desired magnification, and projects the color image on a screen (not shown).

The air intake fan 70 cools each of the optical components disposed on the light path in the projector 200, such as the liquid crystal light valves 40a, 40b, and 40c, the polarization conversion element 24, and so on in an air-cooling manner. It should be noted that in FIG. 1, as an example, there are provided the air intake fan 70 and the exhaust fan 71, and an air filter FT for protecting dust is attached to the air intake fan 70 on the suction side thereof. The air intake fan 70 and each of the optical components are connected via a duct 72, thus the cooling air taken in from the outside by the air intake fan 70 flows to each of the optical components through the duct 72.

The exhaust fan 71 is disposed in the vicinity of the light source device 10, and discharges the air, which has cooled each of the optical components, to the outside. Since the temperature of the light source device 10 is the highest in the projector, by disposing the exhaust fan 71 in the vicinity of the light source device 10, the cooling air can efficiently be discharged.

A first temperature sensor S1 is disposed between the air intake fan 70 and the liquid crystal light valves 40a, 40b, and 40c, namely on a cooling path by the air intake fan 70 and in the anterior stage of the liquid crystal light valves 40a, 40b, and 40c as the target objects of the cooling, and performs measurement of the temperature of the cooling airflow in the anterior stage of the cooling. A second temperature sensor S2 is disposed on the posterior stage side of the cooling path of the liquid crystal light valves 40a, 40b, and 40c as the target objects on the cooling path extending from the duct 72, and performs measurement of the temperature of the cooling airflow on the posterior stage of the cooling. The second temperature sensor S2 is used as a common sensor to the liquid crystal light valves 40a, 40b, and 40c. A third temperature sensor S3 is disposed on the periphery of the light source device 10, and performs measurement of the temperature of the ambient air of the light source device 10. Each of the temperature sensors S1, S2, and S3 is formed of a thermistor sensor formed by processing a thermistor, which is a ceramic semiconductor formed by sintering the material at high temperature including, for example, a metal oxide as a principal material. It should be noted that the temperature sensors S1, S2, and S3 are all disposed at the places where the temperature sensors do not make shadows on the light paths of the projector 200 having the system optical axis OA as the reference.

The fan drive device 90 drives the air intake fan 70 and the exhaust fan 71 as the cooling fans disposed inside the projector 200 in accordance with a drive signal from the control device 80. In other words, in this case, the fans 70, 71 and the fan drive device 90 function as the cooling device for performing the cooling of the optical components of the projector 200.

The control device 80 performs calculation regarding the temperature of the optical components (the liquid crystal light valves 40a, 40b, and 40c in the case with FIG. 1) as the target objects based on the detected temperature measured by each of the first temperature sensor S1 and the second temperature sensor S2, and at the same time, performs control of the air intake fan 70 via the fan drive device 90 based on the result of the calculation. Further, the control device 80 performs control of the exhaust fan 71 based on the detected temperature measured by the third temperature sensor S3. The control device 80 controls the operation of the light source device 10, the liquid crystal panels 41a, 41b, and 41c, and so on in addition to the fans.

Figure 2:
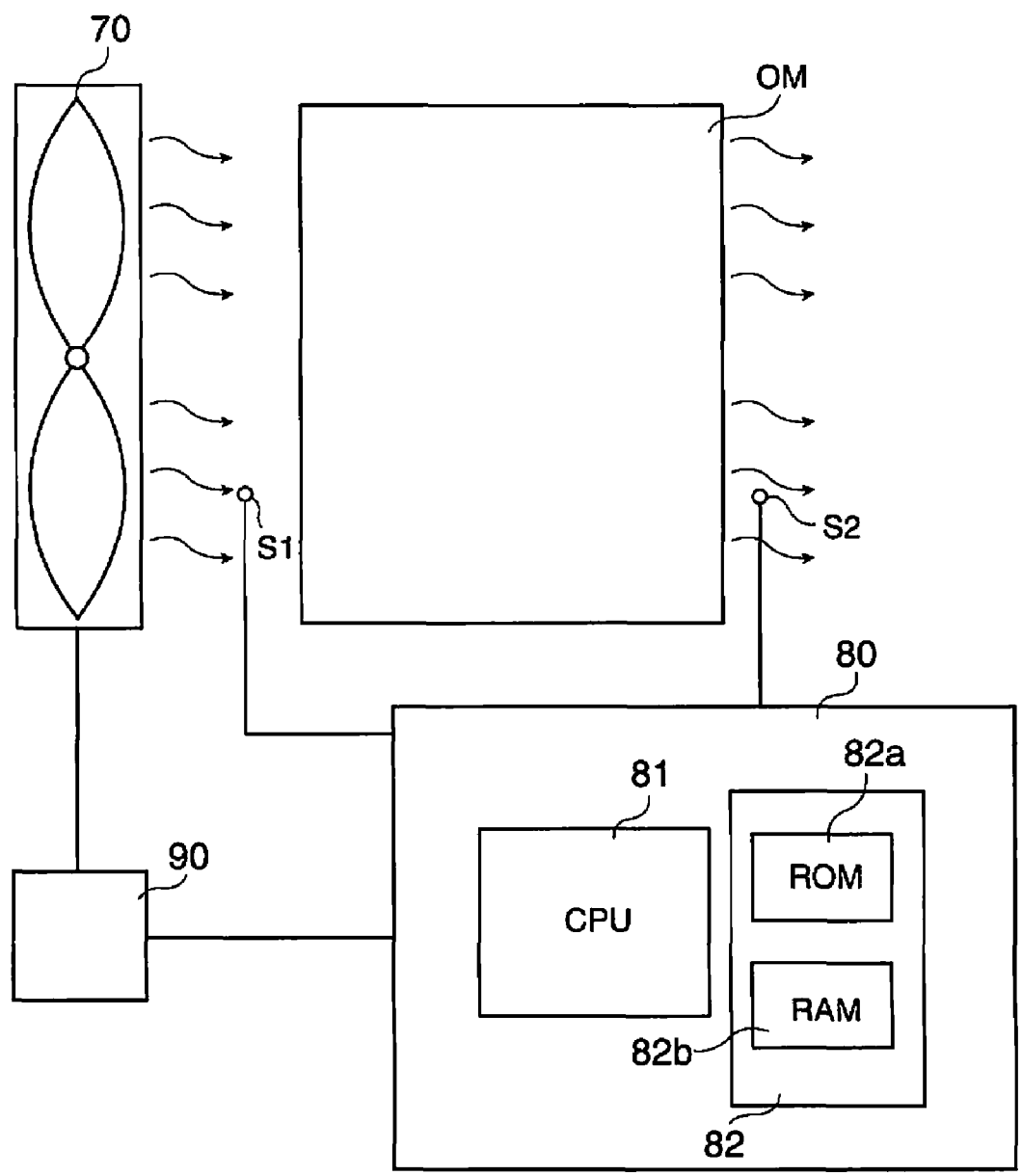
FIG. 2 is a diagram for explaining control of cooling.

Hereinafter, the control of the air intake fan 70 by the control device 80 will be explained in detail with reference to FIG. 2. FIG. 2 is a schematic diagram for explaining the temperature control by the control device 80. The control device 80 is provided with a CPU 81 for performing arithmetic processing for various control operations and a storage device 82 as a storage section for storing data and so on for calculation. The storage device 82 is provided with a ROM 82a storing a program and so on for performing the processing regarding the temperature, and a RAM 82b for temporally storing detected data and so on.

Further, in FIG. 2, the target object OM is a target of the temperature measurement by the first temperature sensor S1 and the second temperature sensor S2. The control device 80 calculates the estimated temperature of the target object OM based on the measured values from the first and second temperature sensors S1, S2, and at the same time, determines the intensity of cooling of the target object OM by the air intake fan 70 based on the value thus calculated. Here, as the target object OM, the optical component disposed on the light path and easily causing the temperature rise can be cited, and correspond to, for example, the liquid crystal light valves 40a, 40b, and 40c in the case of FIG. 1. The liquid crystal light valves 40a, 40b, and 40c are influenced by the temperature in the lives, and consequently, need to be protected from the variation in the temperature. It should be noted that as the optical component to be the target object OM of the cooling, for example, the polarization conversion element 24 shown in FIG. 1 can also be cited in addition to the optical components described above.

Hereinafter, the control of the cooling will be explained with reference to FIG. 2. Firstly, the first temperature sensor S1 is disposed upstream of the target object OM in the cooling path formed of the cooling airflow from the air intake fan 70. Thus, the first temperature sensor S1 measures the first detection temperature Tr on the anterior stage of the cooling of the target object OM. On the other hand, the second temperature sensor S2 is disposed downstream of the target object OM in the cooling path. Thus, the second temperature sensor S2 measures the second detection temperature Ti on the posterior stage of the cooling of the target object OM. In other words, the first detection temperature Tr denotes the temperature of the air before being raised by the heat contained by the target object OM, and is substantially the same as the temperature of the environment in which the projector 200 is disposed. The second detection temperature Ti denotes the temperature of the air after being raised by absorbing the heat of target object OM.

The first and second detection temperatures Tr, Ti respectively detected by the first and second temperature sensors S1, S2 are transmitted to the control device 80 as electrical signals. The CPU 81 temporarily stores the information of the first and second detection temperatures Tr, Ti represented by these signals into the RAM 82b of the storage device 82. Subsequently, the CPU 81 performs calculation of the estimated temperature Tp of the target object OM from the first detection temperature Tr and the second detection temperature Ti based on the information regarding a conversion formula and table data stored in the ROM 82a. The conversion formula for calculating the estimated temperature Tp is represented by the following formula including the first term having the first detection temperature Tr and the second term having a square root of a temperature difference obtained by subtracting the first detection temperature Tr from the second detection temperature Ti.

$$T_p = T_r + a\sqrt{T_i - T_r} + b$$

Here, a and b are constants determined in accordance with a heat release value of the target object OM, an internal structure of the projector, and so on. It should be noted that the derivation of the conversion formula described above for calculating the temperature will be described later in detail. After calculating the estimated temperature Tp of the target object OM based on the conversion formula described above from the detection temperatures Tr, Ti temporarily stored in the RAM 82, the CPU 81 further performs setting of the intensity of the cooling by the cooling device based on the result of the calculation. In other words, the CPU 81 determines the electrical signal for operating the air intake fan 70 with predetermined intensity, and outputs the electrical signal to the fan drive device 90 as the drive signal. When receiving the drive signal from the control device 80, the fan drive device 90 drives the air intake fan 70 with an output (e.g., a fan voltage) corresponding to the drive signal.

Further, the first and second temperature sensors S1, S2 perform the temperature detection continuously or periodically under the control of the control device 80. When newly receiving the detection temperatures Tr, Ti detected by the first and second temperature sensors S1, S2, the control device 80 correspondingly updates the detection temperatures Tr, Ti to perform the calculation regarding the estimated temperature Tp of the target object OM, and changes the setting of the cooling performed by the air intake fan 70 based thereon. Thus, the control device 80 updates the setting of the cooling by feeding-back the temperature condition of the target object OM, and consequently, the temperature variation of the target object OM becomes to fit into a certain range.

Hereinafter, the derivation of the conversion formula for calculating the estimated temperature Tp of the target object OM described above will be explained. Firstly, regarding the variation in the air temperature in the internal space such as the housing SC of the projector 200 of FIG. 1, it is known that the variation ΔTi (=Ti−Tr) in the internal air temperature can be represented by the following formula.

$$\Delta T_i = \frac{Q}{C_p \cdot M} \quad (1)$$

Here, Q denotes a calorific value, Cp denotes an isobaric specific heat of the air, and M denotes a mass flow rate of the fluid.

Further, it is known that the mass flow rate M can be represented by the following formula.

$$M = \frac{V \cdot A}{\rho} \quad (2)$$

Here, V denotes the flow rate, namely the wind velocity, A denotes a cross-sectional area of the flow path, and ρ denotes the density of the air.

If the Q is constant here, the Cp, A, and ρ are constant, and consequently, from the formulas (1) and (2), the variation ΔTi in the internal air temperature is represented as follows.

$$\Delta T_i = \frac{k}{V} \quad (3)$$

Here, k is obtained as k=Q·ρ/Cp·A, and is a constant.

On the other hand, regarding the target object OM, it is known that the relationship between the variation ΔTp (=Tp−Tr) in the target object temperature and the wind velocity V can commonly be represented as the following formula.

$$\Delta T_p = \frac{c}{\sqrt{V}} \quad (4)$$

Therefore, according to the formulas (3) and (4), the relationship of the following formula can be obtained using a constant a.

$$\Delta T_p = a\sqrt{\Delta T_i}$$

In other words, ΔTi=Ti−Tr, and ΔTp=Tp−Tr, and the following expression is obtained.

$$T_p = T_r + a\sqrt{T_i - T_r} \quad (5)$$

Further, here, a constant term b for correcting is added to the formula (5) described above taking the installation positions of the temperature sensors S1, S2 in FIG. 2 and so on into consideration, and the conversion formula for obtaining the estimated temperature Tp is assumed to be the following formula including the first term having the first detection temperature Tr and the second term having a square root of the temperature difference obtained by subtracting the first detection temperature Tr from the second detection temperature Ti.

$$T_p = T_r + a\sqrt{T_i - T_r} + b \quad (6)$$

Hereinafter, a method of calculating the constants described above will be explained using FIG. 3 by way of comparison between the value measured experimentally in a specific device and the value calculated by the conversion formula described above.

Figure 3:
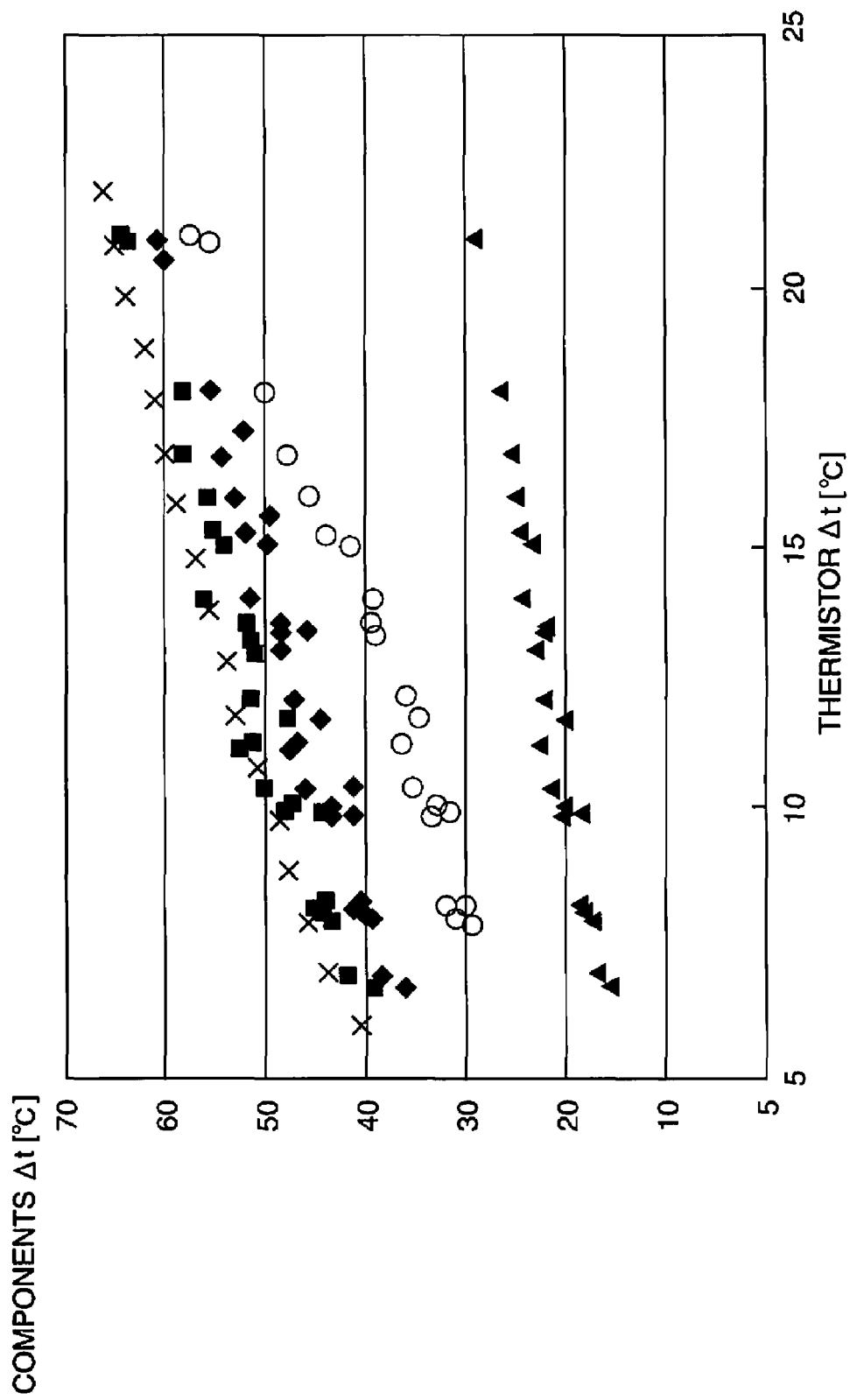
FIG. 3 is a graph showing amount of a variation in increase in the temperature of an optical component inside the projector.
Figure 4B:
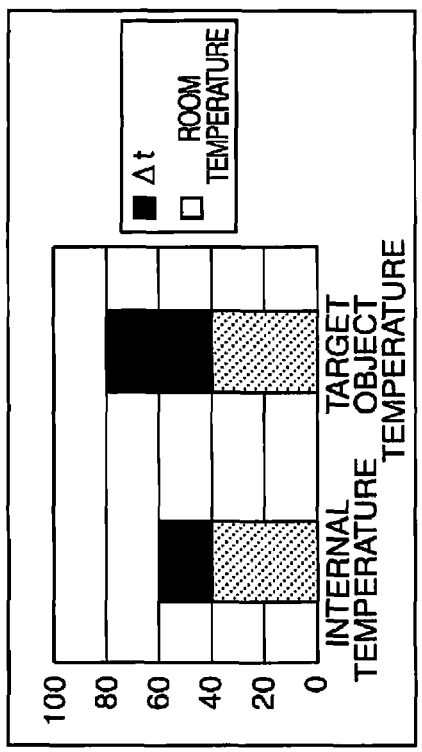
FIGS. 4A through 4C are diagrams for explaining the temperature condition inside a projector of a comparative example.
Figure 4C:
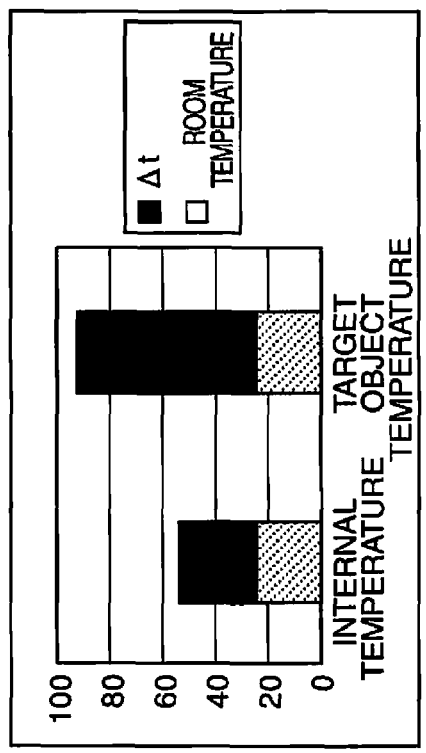
Figure 4A:
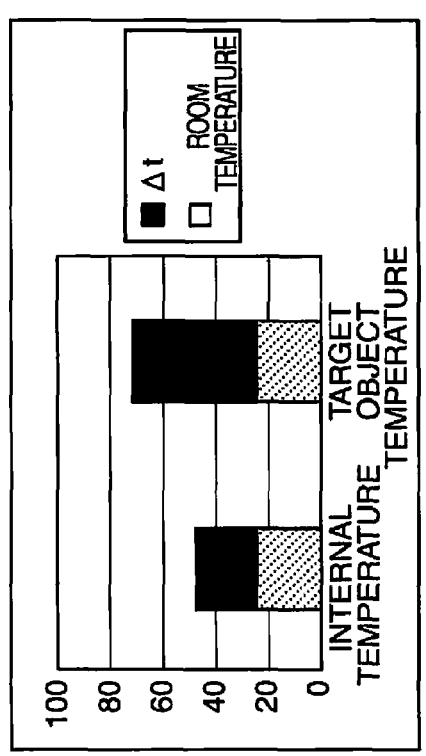

FIG. 3 is a graph showing a relationship among the amount of the temperature variation obtained by subtracting the first detection temperature Tr from the second detection temperature Ti, the amount of variation in the increase in the temperature of the optical component, and the estimated temperature Tp. The horizontal axis represents the temperature obtained by subtracting the first detection temperature Tr from the second detection temperature Ti, and the vertical axis represents the increase in the temperature of each of the optical components. It should be noted here that the graph shown in FIG. 3 is obtained by performing the measurement in the condition in which the liquid crystal panel is in the black screen state with the high brightness, and the temperature rises the most easily. In the drawing, squares and rhombuses respectively represent the polarization plates 43a, 43b correspondingly respectively to the R light and the G light, triangles represent the liquid crystal panel 41c corresponding to the B light, circles represent the polarization conversion element 24, and christcrosses represent the estimated temperature Tp obtained by the formula described above regarding the polarization plate 43a with the highest temperature. A larger temperature rise than the inside of the projector is caused in every optical component. The temperature obtained by subtracting the first detection temperature Tr from the second detection temperature Ti and the temperature rise in the component have the relationship represented by the formula (5), and the estimated temperature Tp and the temperature rise in the polarization plates 43*a* show substantially the equivalent values, thus it proves that the temperature rise in the optical component can be calculated by the formula described above. Further, it is understood that the control is possible also for other optical components by performing the control with the estimated temperature Tp regarding the polarization plates 43*a* having the highest temperature.

Therefore, by using the temperature sensors S1, S2, the control device 80, the fans 70, 71, and so on of the embodiment to the optical element in the severest use environment depending on the use condition of the projector, the optimum cooling control becomes possible, thus the overheating of the entire projector device can be prevented as a result.

Here, in the control device 80 of the present embodiment, in the setting of the intensity of the cooling, the estimated temperature Tp of the target object OM is calculated from the detected temperatures Tr, Ti based on the conversion formula described above, and the intensity of the cooling is set based on the result of the calculation. Regarding the setting of the intensity of the cooling, in addition to the case in which the cooling temperature is calculated from the detection temperatures Tr, Ti based on the conversion formula described above, it is also possible that, for example, table data regarding the values of the estimated temperature Tp estimated from the detection temperatures Tr, Ti based on the conversion formula described above, the experimental data, and so on is previously prepared, and then stored in the ROM 82*a* as the temperature data which can be used for estimation of the temperature of the target object OM for performing a process regarding the temperature. In this case, since the CPU 81 can directly obtain the information regarding the temperature of the target object OM by looking-up the temperature data from the ROM 82*a*, there is no need for performing the process for converting the estimated temperature Tp. It should be noted that the ROM 82*a* can also store the setting values of the intensity of the cooling corresponding to the estimated temperature Tp, namely the values of the electrical signal for defining the value of the fan voltage to be transmitted to the drive device 90 as the data.

Further, in the present embodiment, the first and second temperature sensors S1, S2 are assumed to update the setting of the cooling by feeding-back the condition of the temperature of the target object OM by continuously or periodically performing the temperature detection. On this occasion, when the temperature continues rising despite performing the air-cooling with the set fan voltage, it is possible to change the setting so as to forcibly increase the intensity of cooling under the judgment that the air-cooling performance is reduced by the clogging of the air filter FT, and so on.

Since in the present embodiment, measurement of the temperature of the target object is performed although indirectly and the control of the cooling device is performed based thereon, appropriate cooling control can be performed even in the case in which, for example, the cooling effect has been lowered.

It should be noted that the invention is not limited to the embodiments described above, but can be put into practice in various forms within the scope or the spirit of the invention, and the following modifications, for example, are also possible.

Firstly, although in the embodiment described above the estimated temperature Tp from the detection temperatures Tr, Ti is calculated, there is no need for requiring calculation of the estimated temperature Tp, and the control device 80 can be what calculates another value corresponding to the estimated temperature Tp, thereby performing setting of the intensity of the air intake fan 70.

Further, regarding also the polarization conversion element 24, it is also possible to use the common estimated temperature Tp or to provide a temperature sensor S2 dedicated to the polarization conversion element 24. Although the temperature sensor S1 is disposed between the air intake fan 70 and the liquid crystal light valves 40*a*, 40*b*, and 40*c*, it is possible to dispose the temperature sensor S1 between the filter FT and the air intake fan 70. Further, although the exhaust fan 71 is controlled based on the measurement temperature of the separate temperature sensor S3, it is possible to control the exhaust fan 71 in sync with the air intake fan 70.

Although in the projector 200 of the above embodiment, a pair of fly-eye lenses 23*a*, 23*b* is used for dividing the light beam from the light source unit 11 into a plurality of partial light beams, the invention can also be applied to the projectors, which do not use the fly-eye lens, namely the lens array. Further, the fly-eye lenses 23*a*, 23*b* can also be replaced with a rod integrator.

Further, although in the projector 200, the polarization conversion element 24 for converting the beam from the light source device 10 into a polarized beam with a specified direction is used, the invention can also be applied to the projectors which do not use such a polarization conversion element 24. It should be noted that in this case the temperature sensors S1, S2 have the optical component other than the polarization conversion element 24 as the target object.

Further, although in the embodiment described above, an example of the case in which the invention is applied to the transmissive projector is explained, the invention can also be applied to reflective projectors. It should be noted here that "transmissive" denotes that the liquid crystal light valve including the liquid crystal panel is a type of transmitting a light beam, and "reflective" denotes that the liquid crystal light valve is a type of reflecting a light beam. It should be noted that the light modulation device is not limited to the liquid crystal panel or the like, but can be a light modulation device using micro-mirrors, for example.

Further, as the projector, a front projector performing image projection from a direction of observing the projection screen and a rear projector performing image projection from the opposite direction of observing the projection screen can be cited, and the configuration of the projector shown in FIG. 1 can be applied to the both types of projectors.

Further, although in the embodiment described above, the projector 200 using three liquid crystal panels 41*a* through 41*c* is only cited, the invention can also be applied to a projector using only one liquid crystal panel, a projector using two liquid crystal panels, or a projector using four or more of liquid crystal panels.

The entire disclosure of Japanese Patent Application No. 2007-212643, filed Aug. 17, 2007 is expressly incorporated by reference herein.

What is claimed is:

1. A method for controlling a projector, wherein the projector includes:
    a housing;
    a target object housed inside the housing;
    a cooling device for performing cooling of the target object;
    a first temperature sensor disposed in an anterior stage of the target object on a cooling path formed by the cooling device inside the housing;
    a second temperature sensor disposed in a posterior stage of the target object on the cooling path; and a control device for calculating an estimated temperature of the target object from the first detection temperature and the second detection temperature, and controlling the cooling device based on the result of the calculation, the method comprising:

measuring a first detection temperature in an anterior area of the cooling path among peripheral areas of the target object using the first temperature sensor;

measuring a second detection temperature in a posterior area of the cooling path among the peripheral areas using the second temperature sensor;

performing the calculation of the estimated temperature of the target object using a predetermined conversion formula that includes a term having the first detection temperature that is added to a term having a square root of a temperature difference obtained by subtracting the first detection temperature from the second detection temperature, the conversion formula being represented by the following formula:

$$T_p = T_r + a\sqrt{T_i - T_r} + b$$

where Tp denotes the estimated temperature of the target object, Tr denotes the first detection temperature, Ti denotes the second detection temperature, and a and b are constants determined in accordance with a heat release value of the target object, an internal structure of the projector, or an arrangement of the temperature sensors; and controlling the cooling device based on the result of the calculation.

2. The method according to claim 1, wherein the control device performs setting of intensity of the cooling performed by the cooling device based on the result of the calculation.

3. The method according to claim 1, wherein the control device changes setting of the cooling performed by the cooling device in accordance with an update of the result of the calculation, thereby controlling a temperature variation of the target object within a certain range.

4. The method according to claim 1, wherein the target object is an optical component.

5. The method according to claim 4, wherein the optical component includes one of a liquid crystal panel, a polarization plate, and a polarization conversion element.

6. The method according to claim 1, wherein the cooling device further including a cooling fan for generating a cooling airflow, the first temperature sensor is disposed upstream of the target object in the cooling airflow, and the second temperature sensor is disposed downstream of the target object in the cooling airflow.

7. The method according to claim 1, wherein the projector further includes:

an illumination light source device for equalizing light source beam from a light source to form illumination light;

a light modulation device illuminated by the illumination light from the illumination light source device; and a projection optical system for projecting an image beam obtained via the light modulation device, wherein the target object is included in at least one of the illumination light source device, the light modulation device, and the projection optical system.

* * * * *